United States Patent [19]

D'Angelo et al.

[11] 4,273,584
[45] Jun. 16, 1981

[54] DETERGENT RESISTANT COMPOSITIONS

[75] Inventors: Paul F. D'Angelo, Ossining; Richard B. Metzler, Briar Cliff Manor, both of N.Y.

[73] Assignee: Union Carbide Corporation, New York, N.Y.

[21] Appl. No.: 100,990

[22] Filed: Dec. 7, 1979

[51] Int. Cl.³ ............................................... C09G 1/00
[52] U.S. Cl. ........................................ 106/3; 106/8; 106/9; 106/11; 106/287.11; 106/287.12; 106/287.13; 427/355; 260/29.2 M; 260/33.6 SB; 528/30; 528/33; 556/413
[58] Field of Search ............... 106/3, 8, 9, 11, 287.11, 106/287.12, 287.13; 528/30, 33; 260/29.2 M, 33.6 SB; 427/355; 556/413

[56] References Cited

U.S. PATENT DOCUMENTS

| | | | |
|---|---|---|---|
| 3,836,371 | 9/1974 | Kokoszka | 106/10 |
| 3,876,459 | 4/1975 | Burrill | 8/127.6 |
| 3,890,271 | 6/1975 | Kokoszka | 106/10 |

*Primary Examiner*—Melvyn I. Marquis
*Attorney, Agent, or Firm*—Richard J. Gallagher

[57] ABSTRACT

Detergent resistant compositions made by blending (I) a hydroxy-terminated polydimethylsiloxane, (II) an amino-polysilane, and (III) an optionally partially hydrolyzed organotrialkoxysilane can be employed in such end-use applications as car polishes and vinyl protectants.

6 Claims, No Drawings

DETERGENT RESISTANT COMPOSITIONS

BACKGROUND OF THE INVENTION

1. Field of the Invention

This invention relates to detergent resistant compositions composed of silicones, aminosilanes, and organotrialkoxy silanes which may be partially hydrolyzed, and to their use in forming detergent resistant films, finishes, or coatings for such applications as car polishes and vinyl protectants.

2. Description of the Prior Art

Detergent resistant compositions consisting essentially of hydroxy-terminated polydimethylsiloxanes, amino-monosilanes, and organotrialkoxysilanes are disclosed in U.S. Pat. No. 3,836,371 and 3,890,271. The prior art compositions, when they are allowed to cure in a thin film at ambient conditions, remain tacky and are easily smeared and susceptible to picking up dirt particles. U.S. Pat. No. 3,876,459 discloses that compositions obtained by mixing hydroxy-terminated polydimethylsiloxanes, amino-monosilanes, and organotrialkoxysilanes which may be partially hydrolyzed can be used to render keratinous fibers (e.g., wool) shrink resistant.

SUMMARY OF THE INVENTION

Novel detergent resistant compositions are made by blending (I) a hydroxy-terminated polydimethylsiloxane, (II) an amino-polysilane, and (III) an organotrialkylsilane which may be partially hydrolyzed. The compositions can be applied to metal and vinyl surfaces from organic solvent solutions or water-based emulsions to form detergent resistant films, finishes, or coatings. In particular, the compositions can be used as additives in car polishes and vinyl protectants, to which they impart detergent resistant properties.

DESCRIPTION OF THE PREFERRED EMBODIMENTS

The novel detergent resistant compositions of this invention contain three primary components.

Component I is a hydroxy-endcapped polydimethylsiloxane fluid (i.e. a silanol fluid) of the formula $HO[Si(CH_3)_2O]_xH$, wherein x has values which result in fluid viscosities ranging from 10 to 100,000 (when x equals about 5 to about 1400), preferably from 50 to 20,000, and most preferably from 50 to 1000, centistokes at room temperature. Small amounts, i.e. up to about two percent, of various other groups, such as ethyl, propyl, phenyl, vinyl, 3,3,3-trifluoropropyl, and cyanoethyl, can be substituted for the methyls in the fluids without rendering them unsuitable for the present purpose. Component I can comprise a blend of the silanol fluids as described by the above formula. Component I comprises from 35% to 99.5%, and preferably from 70% to 95% by weight of the composition.

Component II is an amino-polysilane of the formula

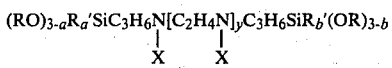

wherein R and R' are alkyl groups of from one to eight carbon atoms, preferably methyl, a and b have values of zero and one, preferably zero, y has a value of from zero to twenty, preferably from zero to three, and X is hydrogen or an organotrialkoxysilyl group of the formula —L—Si(OR)$_3$ wherein R is as defined above and L is —CH$_2$CHOHCH$_2$C$_3$H$_6$— or, preferably, —C$_3$H$_6$—. Examples of amino-polysilane suitable for use according to this invention are:

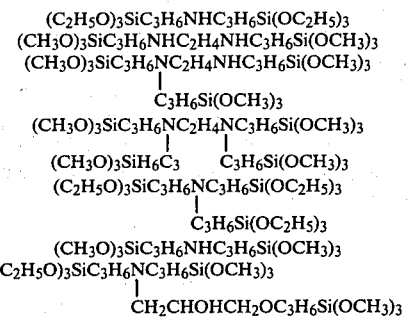

It is within the scope of this invention to utilize the Component II amino-polysilanes as blends. The Component II amino-polysilane blend may include a minor amount of other amino-silanes. For example, a typical preferred blend contains a major amount of some of the amino-polysilanes and a minor amount of the amino-silane (CH$_3$O)$_3$SiC$_3$H$_6$NHC$_2$H$_4$NH$_2$. Component II provides the composition with from 0.8% to 75%, preferably from 2 to 25%, by weight of amino-polysilane as described.

The Component II amino-polysilanes can be prepared by appropriate amine alkylations. For example,

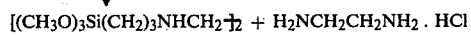

Alternately,

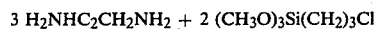

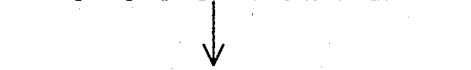

Component III is an organotrialkoxysilane of the formula (RO)$_3$SiZ or a partially hydrolyzed organotrialkoxysilane of the formula

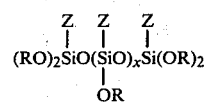

wherein R is an alkyl group of from one to eight carbon atoms, preferably methyl or ethyl, x has a value of from 0 to 100, and is preferably a value which will provide this component with an SiO content of from 30% to 75% weight, and Z is a nonhydrolyzable aliphatic hydrocarbon group containing up to ten carbon atoms which may contain halogen or oxygen-containing groups. e.g. methyl, ethyl (which is preferred), chloropropyl, glycidoxypropyl, and gamma-methacryloxypropyl. The hydrolyzed compounds can be prepared, for example, by the HCl-catalyzed hydrolysis of e.g.

methyl triethoxysilane. Blends of organotrialkoxysilanes and/or partially hydrolyzed organotrialkoxysilanes may be used. Component III comprises from 0.5% to 65%, preferably from 2% to 25%, by weight of the composition.

The composition of this invention can be made by blending the three components—silanol fluid, aminopolysilane, and (partially hydrolyzed) organotrialkoxysilane—in any order at room or elevated temperatures, up to the boiling point of any component. The blending can be done neat or in organic solvents (e.g. mineral spirits, toluene, hexane).

Preferably the aminosilane is blended with the (partially hydrolyzed) organotrialkoxysilane and then the hydroxy-terminated polydimethylsiloxane fluid is added to the silane blend. The three component blend can be applied neat, from an organic solvent, or from a water based emulsion to various surfaces (e.g. vinyl and metal surfaces of automobiles) or added to various products (car polishes, vinyl protectants).

The weight ratio of hydroxy-terminated polydimethylsiloxane fluid to a silane blend is determined by the viscosity of the fluid. For a silanol fluid of 100 centistokes viscosity at room temperature, a useful weight ratio of fluid to silane blend if five to one; for a fluid of 1000 centistokes viscosity at room temperature, a useful weight ratio is fifteen to one. The weight ratio of aminopolysilane to (partially hydrolyzed) organotrialkoxysilane can vary over a wide range but is typically near a ratio of one to one.

Preferably, the three component blend is stirred or shaken at room temperature for one hour before its application to various surfaces or its addition to car polishes and vinyl protectants. However, it may be stirred or shaken for shorter times at higher temperatures, e.g. for 5 minutes at 80° C. The stirring or shaking interval allows for sufficient reaction among the components to ensure a high level of detergent resistance. The components can also be reacted in organic solvents; here elevated temperature and concentration of 10% by weight or more of components are preferred to ensure a fast buildup of detergent resistance.

The compositions must be stored in the absence of moisture either neat or diluted with organic solvents to substantially reduce any tendency to gel. Organic solvents suitable for end-use applications in car polishes and vinyl protectants include mineral spirits, benzene, toluene, etc. Because of the high reactivity of the compositions of the present invention, it is preferred to apply or add them to surfaces or products (e.g. car polishes) once a high level of detergent resistance has been generated, e.g. after one hour of stirring or shaking at room temperature.

Detergent resistant car polish compositions according to the present invention, which are suitable for used on the painted exterior surfaces of automobiles, generally contain, inter alia, a minor amount of an active detergent resistant composition as described herein and an organic solvent as indicated above. For example, such a car polish may contain from 0.5% to 10% by weight of said active composition, from 0.1% to 5% by weight of an emulsufier, from 10% to 40% by weight of a solvent, from 1% to 20% by weight of an abrasive, and from 40% to 80% by weight of water. In addition, the car polish may contain such optional ingredients as waxes, thickeners, perfumes, etc.

Examples

The following Examples are illustrative of the present invention. However, they are not intended to limit the scope of the invention, and other embodiments thereof are encompassed by the preceding generic disclosure and the appended claims.

EXAMPLES 1-5

The following specific embodiments of the three components of the compositions of this invention were utilized:

I. A hydroxy-terminated polydimethylsiloxane fluid of the formula $HO[Si(CH_3)_2O]_xH$, having a room temperature viscosity of 135 centistokes.

II. A complex mixture of amino-polysilanes, of which the major components and their percents by weight of the mixture were:

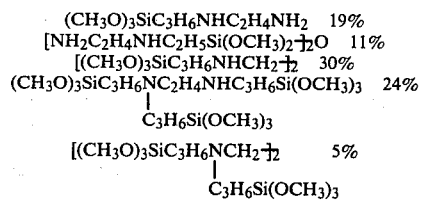

III. An approximately 53% hydrolyzed methyltriethoxysilane of the formula

Five compositions of this invention were prepared by blending the complex mixture of amino-polysilanes (II) with the hydrolyzed methyltriethoxysilane (III). To this silane blend was added the hydroxy-terminated polydimethylsiloxane fluid (I). The amounts of each of the three components in these blends is shown below:

| Component | Blend Examples (parts by weight) | | | | |
|---|---|---|---|---|---|
| | 1 | 2 | 3 | 4 | 5 |
| I | 10.4 | 7.8 | 6.5 | 5.8 | 10.4 |
| II | 1.0 | 1.0 | 1.0 | 1.0 | 1.0 |
| III | 1.1 | 0.6 | 0.3 | 0.1 | 0.35 |

EXAMPLES 6-10

The emulsion/cleaner polish was prepared by combining 2 parts of each blend of Examples 1-5, 1 part of a nonionic sorbitan mono oleate emulsifier, 23.3 parts of Mineral Spirits 66 Solvent (American Mineral Spirits Co.), 10.5 parts of an uncalcined diatomite celite mineral abrasive, and 63.3 parts deionized water. The mineral spirits and emulsifier were mixed; then each blend was mixed with the emulsifier/mineral spirits blend. The abrasive was then added and mixed. Finally, the deionized water was added and mixed. The emulsion/cleaner polish was shaken on a Burrell Shaker for one hour (setting 10). The car polishes are listed below.

| Ingredients | Car Polish Examples (p.b.w.) | | | | |
|---|---|---|---|---|---|
| | 6(1) | 7(2) | 8(3) | 9(4) | 10(5) |
| Blend 1-5 respectively | 2.0 | 2.0 | 2.0 | 2.0 | 2.0 |
| Emulsifier | 1.0 | 1.0 | 1.0 | 1.0 | 1.0 |
| Mineral Spirits 66 | 23.2 | 23.2 | 23.2 | 23.2 | 23.2 |

-continued

| | Car Polish Examples (p.b.w.) | | | | |
|---|---|---|---|---|---|
| Ingredients | 6(1) | 7(2) | 8(3) | 9(4) | 10(5) |
| Abrasive | 10.5 | 10.5 | 10.5 | 10.5 | 10.5 |
| Deionized Water | 63.3 | 63.3 | 63.3 | 63.3 | 63.3 |

Example of Detergent Resistance

In these Examples, tests were conducted according to the following procedures. The results are reported in Table 1.

Detergent Resistance Test Method for Automobile Polishes

A. SUBSTRATE

C.S.M.A. approved test panel finished with black automotive paint, measuring twelve inches by twelve inches (12"×12"). The panel should be used or "pre-conditioned"; not new or "virgin".

B. CLEANING OF THE PANEL

First, pre-clean with rubbing compound, then follow by washing with the detergent solution, described later, until water fully wets the sheet and does not bead-up on the surface.

C. APPLICATION OF THE POLISHES

1. The sheet is divided into two equal parts with strips of one-inch masking tape.
2. Using a Gardner gloss meter (60°), that has been standardized, take base point gloss measurements of each section of the unpolished panel that is to be used for evaluation of the candidate polishes.
3. The polishes to be compared are applied in about the same amount—approximately 15 gms—(providing they have the same concentration) with a two-inch by two-inch (2"×2") four layered swatch of cheesecloth. After the films were dried they are polished with a new two-inch by two-inch (2"×2") cheesecloth swatch. Application ease of polish and ease of rubout of dried polishes are judged subjectively.

D. AGING

The panel is aged for at least twenty-four hours at room temperature.

E. TEST FOR DETERGENT-RESISTANCE

1. Before the detergent washing procedure again measure the gloss each polished section of the test panel for a second reference or base point.
2. Detergent Solution
   1% Triton X-100(Rohm & Haas-10 mole ethoxylate of octylphenol)
   4% Potassium tripolyphosphate-(Available from Industrial Division, Stauffer Chemical Company)
   95% Water (Preferably deionized) 100%
3. Washing Procedures
   a. Polished panels are placed into a support stand over a sink.
   b. Panels are wet down by cold water from rinse hose. Any marring of the panels by water is noted.
   c. A clean towel is dipped into the detergent solution and drained (except for the prewash step).
   d. The whole panel is washed back and forth, up and down, and back and forth.
   e. The panel is then rinsed with cold water until no detergent film remains.
   f. Cold water from a 300 ml. beaker is poured through funnels onto the panels. The water runoff properties are observed. This is done three times.
   g. The panel is then dried and a gloss measurement is done or, the next washing is done.

F. DETERGENT RESISTANCE PROPERTIES

I. Water Runoff
1. Measured after each washing.
2. Measured in seconds.
3. Time from when last part of water stream from funnel hits the panel until time when water stream on panel totally beads up.
4. Runoff times of 1–2 seconds were excellent; 3–4 seconds good; 5–6 fair; >6 poor.

II. Water Beading
1. Observed after each washing.
2. Recorded as yes (occurring)-no (no longer occurring).
3. Observation of contact angle can indicate when detergent resistance of a polish is starting to fail. (The smaller the angle the nearer to polish failure).
4. When beading no longer occurs, the polish is considered to have failed.
5. Beading failure after 15 or more detergent washings was judged excellent; between 10–14, good; 5–9, fair; 0–4, poor.

III. Gloss Measurement
1. Five measurements are made per panel; one near each corner and one in the center. The average is considered the gloss of the panel.
2. Measurements are made:
   a. Unpolished panels-Gloss of dried panels after abrasive cleaning.
   b. Polished panel-Gloss of panels after polish application and buffing.
   c. Prewash-panels are rinsed in cold water; then three, 250 ml. beakers of cold water are poured through the funnels onto the top-center of each panel. Gloss measurements are: 3 from the center of the runoff area and 3 from the outside area.
   d. After wash 1, 5, 10, and 15.
   e. Gloss retention of 90+% was excellent; 70–90%, good; 50–70%, fair; 50%, poor.

TABLE 1

DETERGENT RESISTANCE[1] OF CAR POLISHES OF EXAMPLE 6–10

| Car Polish Examples | Application Ease | Application Rubout | Water Marring | Gloss Retention[2] | Water Beading[2] | Water Runoff[2] |
|---|---|---|---|---|---|---|
| 6 | Good | Good | No | Excellent | Excellent | Excellent |
| 7 | Good | Good | No | Excellent | Excellent | Excellent |
| 8 | Good | Good | No | Excellent | Excellent | Excellent |
| 9 | Good | Good | No | Good | Excellent | Good |
| 10 | Good | Good | No | Excellent | Excellent | Excellent |

[1]Detergent resistance relates to amount of retention of gloss and water beading, and water runoff time after a specified number of detergent washings.
[2]After 15 detergent washings at room temperature

EXAMPLES 11-15

The following specific embodiments of the three components of the compositions of this invention were utilized:

I. A hydroxy-terminated polydimethylsiloxane fluid of the formula $HO[Si(CH_3)_2O]_xH$, having a room temperature viscosity in centistokes as indicated.

II. A complex mixture of amino-polysilanes of which the major components and their percents by weight of the mixtures were:

$(CH_3O)_3SiC_3H_6NHC_2H_4NH_2$    2%
$[NH_2C_2H_4NHC_2H_5Si(OCH_3)_2]_2$    13%
$[(CH_3O)_3SiC_3H_6NHCH_2\!\!-\!\!]_2$    36%

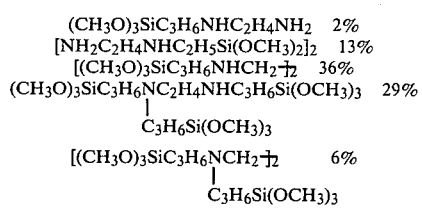 29%

 6%

III. An approximately 53% hydrolyzed methyltriethoxysilane of the formula $(C_2H_5O)_2Si(CH_3)O[Si(OC_2H_5)(CH_3)O]_8Si(CH_3)(OC_2H_5)_2$ Compositions of this invention were prepared by blending the complex mixture of amino-silanes (II) with the hydrolyzed methyltriethoxysilane (III). To this silane blend was added the hydroxy-terminated polydimethylsiloxane fluid (I). The amounts of each of the three components in these blends is shown below:

| Component | Blend Examples (parts by weight) | | | | |
|---|---|---|---|---|---|
|  | 11 | 12 | 13 | 14 | 15 |
| I (130 cs.) | 10.4 | — | — | — | — |
| I (178 cs.) | — | 16.1 | — | — | — |
| I (387 cs.) | — | — | 23.4 | — | — |
| I (500 cs.) | — | — | — | 31.3 | 28.0 |
| II | 1.0 | 1.0 | 1.0 | 1.0 | 1.0 |
| III | 1.1 | 1.1 | 1.1 | 1.1 | 1.1 |

EXAMPLES 16-19

The emulsion/cleaner polish was prepared by combining 2 parts of each blend of Examples 11-14, non-ionic sorbitan mono oleate emulsifer, Mineral Spirits 66 Solvent (American Mineral Spirits Co.), an uncalcinined diatomite celite mineral abrasive (except in Example 16, which is not a cleaner), and deionized water. The mineral spirits and emulsifier were mixed; then each blend was mixed with the emulsifier/mineral spirits blend. The abrasive was then added and mixed. Finally, the deionized water was added and mixed. The emulsion/cleaner polish was shaken on a Burrell Shaker for one hour (setting 10). The car polishes are listed below:

| Ingredients | Car Polish Examples (p.b.w.) | | | |
|---|---|---|---|---|
|  | 16(11) | 17(12) | 18(13) | 19(14) |
| Blend 11-14, respectively | 2.0 | 2.0 | 2.0 | 2.0 |
| Emulsifier | 1.0 | 1.0 | 1.0 | 1.0 |
| Mineral Spirits 66 | 26.0 | 23.2 | 23.2 | 23.2 |
| Abrasive | — | 10.5 | 10.5 | 10.5 |
| Deionized Water | 71.0 | 63.3 | 63.3 | 63.3 |

Detergent resistance tests were conducted as described above. The results are indicated in Table 2.

TABLE 3
DETERGENT RESISTANCE[1] OF CAR POLISHES OF EXAMPLES 16-19

| Car Polish Examples | Application Ease | Application Rubout | Water Marring | Gloss Retention | Water Beading | Water Runoff |
|---|---|---|---|---|---|---|
| 16 | Good | Good | No | Fair[2] | Excellent[2] | Excellent[2] |
| 17 | Good | Good | No | Excellent[3] | Fair[3] | Excellent[3] |
| 18 | Good | Good | No | Good[3] | Fair[3] | Excellent[3] |
| 19 | Good | Good | No | Excellent[3] | Poor[3] | Excellent[3] |

[1]Detergent resistance relates to amount of retention of gloss and water beading, and water runoff times after a specified number of detergent washings.
[2]After 15 detergent washings at room temperature.
[3]After 10 detergent washings at room temperature.

EXAMPLE 20

This example compares the tackiness of the blend of Example 15 with that of a detergent resistant composition containing 48.0 parts by weight of the 500 centistoke embodiment of Component I, 1.0 parts by weight of an aminomonosilane of the formula $(CH_3O)_3SiC_3H_6NHC_2H_4NH_2$, and 0.6 parts by weight of $CH_3Si(OCH_3)_3$. The latter composition is believed to be representative of the compositions taught by U.S. Pat. Nos. 3,836,371 and 3,890,271.

Aluminum panels were coated with composition of this invention (Example 15) and the prior art composition. The compositions were made by blending procedures described in Examples 1-4. A Baker's knife coater was used to lay down approximately 0.5 mil. coating on the aluminum panels. After the compositions were coated and allowed to cure for 24 hours at room temperature, a salt, talc, and sand mixture was applied to the coated aluminum panels.

The salt, talc, and sand mixture was made by mixing 10% by weight talc, 10% by weight 40 Mesh limestone, 5% by weight salt, and 75% by weight water. 30 grams of mixture was put on coated aluminum panels and spread around to cover panel. The mixture was allowed to dry on the panels; drying took from one to four hours. These mixture treated panels were hosed down with water for one minute at room temperature to see how easily cleaned the panels were.

A cured coating of the Example 15 (Blend I) on aluminum panels was found to be clear, shiny, tack free coating. A cured coating of the prior art blend (Blend II) on aluminum panels was found to be a hazy, shiny, slightly tacky coating.

Hosing down with water the talc/salt/sand treated aluminum panel coated with a cured coating of Blend I removed approximately 80% of the talc/salt/sand mixture. Hosing down with water the talc/salt/sand treated aluminum panel coated with a cured coating of Blend II removed approximately 10% of the talc/salt/sand mixture. The percent removal was estimated visually. It was concluded that aluminum panels containing a cured coating of Blend I of this invention are more easily cleaned than aluminum panels containing a cured coating of Blend II of the prior art.

EXAMPLES 21 AND 22

The following specific embodiments of the three components of the compositions of this invention were utilized:

I. A hydroxy-terminated polydimethylsiloxane fluid of the formula $HO[Si(CH_3)_2O]_{\sim 55}H$, having a room temperature viscosity of 135 centistokes.

II. a. In Example 21, an amino-polysilane of the formula $(CH_3O)_3SiC_3H_6NHC_2H_4N[C_3H_6Si(OCH_3)_3]_2$, which can be made by the following reaction scheme:

$(CH_3O)_3SiC_3H_6NHC_2H_4NH_2 + 2\ (CH_3O)_3SiC_3H_6Cl$

↓ Nitrogen Atmosphere
110° C.
8 Hours $(CH_3O)_3SiC_3H_6NHC_2H_4N[C_3H_6Si(OCH_3)_3]_2 \cdot HCl$

↓ +2 $NH_2C_2H_4NH_2$
(EDA)

$(CH_3O)_3Si\ C_3H_6NHC_2H_4N[C_3H_6Si(OCH_3)_3]_2 + 2\ EDA \cdot HCl$

II. b. In Example 22, an amino-polysilane of the formula $[(C_2H_5O)_3SiC_3H_6]_2NH$, which can be made by reacting one mole of triethoxysilylpropylamine (U.S. Pat. Nos. 2,837,551 and 2,930,809) with one mole of chloropropyltriethoxysilane at 120° C. for approximately 4 hours, followed by the addition of one mole of ethylenediamine to remove HCl from the silane. The two layers present are then separated and the layer containing the silane is stripped of volatiles.

III. An approximately 53% hydrolyzed methyltriethoxysilane of the formula $(C_2H_5O)_2Si(CH_3)O[Si(OC_2H_5)(CH_3)O]_{\sim 8}Si(CH_3)(OC_2H_5)_2$ Compositions of this invention were prepared by blending the amino-polysilanes (II) with the hydrolyzed methyltriethoxysilane (III). To this silane blend was added the silanol fluid (I). The amounts of each of the three components in these blends is shown below:

| Component | Blend Examples (parts by weight) | |
|---|---|---|
| | 21 | 22 |
| I | 15.0 | 15.0 |
| IIa | 2.1 | — |
| IIb | — | 1.5 |
| III | 1.5 | 1.5 |

EXAMPLES 23 AND 24

An emulsion/cleaner polish was prepared by combining 2 parts of each blend of Examples 21 and 22, nonionic sorbitan mono oleate emulsifier, Mineral Spirts 66 Solvent (American Mineral Spirits Co.), an uncalcined diatomite celite mineral abrasive, and deionized water. The mineral spirits and emulsifier were mixed; then each detergent resistant blend was mixed with the emulsifier/mineral spirits blend. The abrasive was then added and mixed. Finally, the deionized water was added and mixed. The emulsion/cleaner polish was shaken on a Burrell Shaker for one hour (setting 10). The car polishes are listed below:

| Ingredients | Car Polish Examples (p.b.w.) | |
|---|---|---|
| | 23(21) | 24(22) |
| Blends 21 and 22, respectively | 2.0 | 2.0 |
| Emulsifier | 1.0 | 1.0 |
| Mineral Spirits 66 | 23.2 | 23.2 |
| Abrasive | 10.5 | 10.5 |
| Deionized Water | 63.3 | 63.3 |

Detergent resistance tests were conducted as described above in connection with Table I. The results are indicated in Table 4.

TABLE 4
DETERGENT RESISTANCE[1] OF CAR POLISHES OF EXAMPLES 23 and 24

| Car Polish Examples | Application Ease | Application Rubout | Water Marring | Gloss Retention[2] | Water Beading[2] | Water Runoff[2] |
|---|---|---|---|---|---|---|
| 23 | Good | Good | No | Good | Excellent | Good |
| 24 | Good | Good | No | Excellent | Excellent | Good |

[1]Detergent resistance relates to amount of retention of gloss and water beading, and water runoff time after a specified number of detergent washings.
[2]After 15 detergent washings at room temperature.

EXAMPLE 25

A composition of this invention was prepared by blending (II) 1.4 parts by weight of a complex mixture of amino-polysilanes as described above in connection with Examples 1–5 with (III) 1.5 parts of weight of a hydrolyzed gamma-methacryloxypropyl silane of the formula $$(CH_3O)_2Si(SiO)_{\sim 20}Si(OCH_3)_2$$
with Z substituents wherein $Z = -C_3H_6OCOC(CH_3)=CH_2$. Said hydrolyzed silane was made by adding 1.4 moles of water (pH-4-5) to 1 mole of gamma-methacryloxypropyltrimethoxysilane; the hydrolyzed silane was then neutralized and stripped of volatiles. To the silanes blend (2.9 parts by weight) was added (I) 15.0 parts by weight of a hydroxy-terminated polydimethylsiloxane fluid as described above in connection with Examples 1–5.

EXAMPLE 26

An emulsion/cleaner polish was prepared by combining 2.0 parts of the blend of Example 25 with 1.0 part of nonionic sorbitan mono oleate emulsifier, 23.2 parts of Mineral Spirits 66 Solvent (American Mineral Spirits Co.), 10.5 parts of an uncalcined diatomite celite mineral abrasive, and 63.3 parts of water (all parts being parts by weight). The ingredients were mixed as described above, e.g. in connection with Example 6–10.

Detergent resistance tests were conducted as described above in connection with Table 1. The results are indicated in Table 5.

TABLE 5

| Car Polish/Example | Application Ease | Application Rubout | Water Marring | Gloss Retention[2] | Water Beading[2] | Water Runoff[2] |
|---|---|---|---|---|---|---|
| 26 | Good | Good | No | Good | Good | Fair |

[1] Detergent resistance relates to amount of the retention of gloss and water beading, and water runoff times after a specified number of detergent washings.
[2] After 15 detergent washings at room temperature.

What is claimed is:

1. A detergent resistant composition which comprises

I. from 35% to 99.5% by weight of a component of the formula $HO[Si(CH_3)_2O]_xH$, wherein x is a numerical value which will provide said component with a viscosity in the range of from 10 to 100,000 centistokes at ambient temperature, II. from 0.8% to 75% by weight of a component of the formula $$(RO)_{3-a}R_a'SiC_3H_6N[C_2H_4N]_yC_3H_6SiR_b'(OR)_{3-b}$$
$$\quad\quad\quad\quad\quad\quad | \quad\quad |$$
$$\quad\quad\quad\quad\quad\quad X \quad\quad X$$

wherein R and R' are alkyl groups of from one to eight carbons, a and b have values of zero and one, y has a value of from zero to twenty, and X is hydrogen or an organotrialkoxysilyl group of the formula $-L-Si(OR)_3$ wherein R is as defined above and L is $-C_3H_6-$ or $-CH_2CHOHCH_2C_3H_6-$, and III. from 0.5% to 65% by weight of a component of the formula $(RO)_3SiZ$ or a component of the formula $$\quad\quad Z \quad Z \quad Z$$
$$\quad\quad | \quad | \quad |$$
$$(RO)_2SiO(SiO)_xSi(OR)_2$$
$$\quad\quad\quad |$$
$$\quad\quad\quad OR$$

wherein R is an alkyl group of from one to eight carbons, x has a value of from 0 to 100, and Z is a nonhydrolyzable aliphatic group containing up to ten carbon atoms.

2. A detergent resistant composition as in claim 1 which comprises:

I. from 70% to 95% by weight of a component of the formula $HO[Si(CH_3)_2O]_xH$, wherein x is a numerical value which will provide a said component with a viscosity in the range of from 50 to 1000 centistokes at ambient temperature, III. from 2% to 25% by weight of a component of the formula $$(RO)_3SiC_3H_6N[C_2H_4N]_yC_3H_6Si(OR)_3$$
$$\quad\quad\quad | \quad\quad\quad\quad\quad |$$
$$\quad\quad\quad X \quad\quad\quad\quad\quad X$$

wherein R is methyl or ethyl, y has a value of from zero to three, and X is hydrogen or $-C_3H_6-Si(OR)_3$ and III. from 2% to 25% by weight of a component of the formula $$(RO)_2Si(CH_3)O[(RO)Si(CH_3)O]_x(CH_3)Si(OR)_2$$

wherein R is methyl or ethyl and x is from 5 to 20.

3. A detergent resistant composition as in claim 2 wherein component II comprises a mixture of aminopolysilanes which includes more than 20% by weight of $[(CH_3O)_3SiC_3H_6NHCH_2\!-\!]_2$.

4. A detergent resistant car polish or vinyl protectant composition which contains a minor amount of a composition according to one of claims 1 or 2 or 3 and an organic solvent.

5. A detergent resistant car polish composition according to claim 4 which is suitable for use on the painted exterior surface of an automobile and which contains from 0.5% to 10% by weight of the composition according to one of claims 1 or 2 or 3, from 0.1% to 5% by weight of an emulsifier, from 10% to 40% by weight of a solvent, from 1% to 20% by weight of an abrasive, and from 40% to 80% by weight of water.

6. A method for imparting a detergent resistant polished finish to the painted exterior surface of an automobile which comprises applying thereto a film of a composition according to claim 5, allowing said film to dry, and subsequently rubbing the resulting film-covered surface with a suitable fiber-containing material.

* * * * *